Feb. 2, 1971  D. A. SCHAFFER  3,559,471
APPARATUS FOR AND METHOD OF TESTING A SEVERABLE
SECTION IN A WALL
Filed June 6, 1969  4 Sheets-Sheet 1
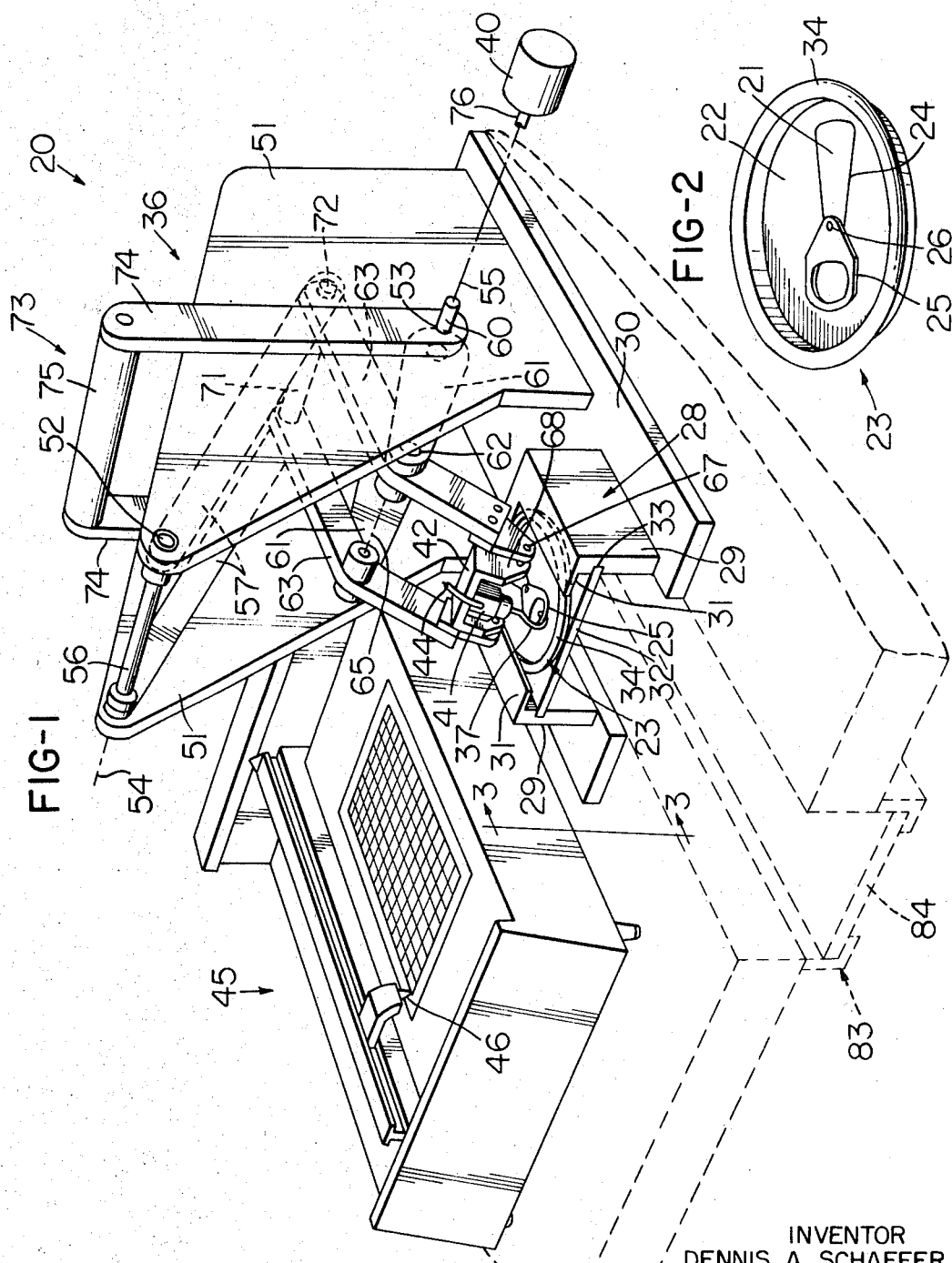
INVENTOR
DENNIS A. SCHAFFER
BY Glenn, Palmer, Lyne,
Gibbs & Thompson
HIS ATTORNEYS

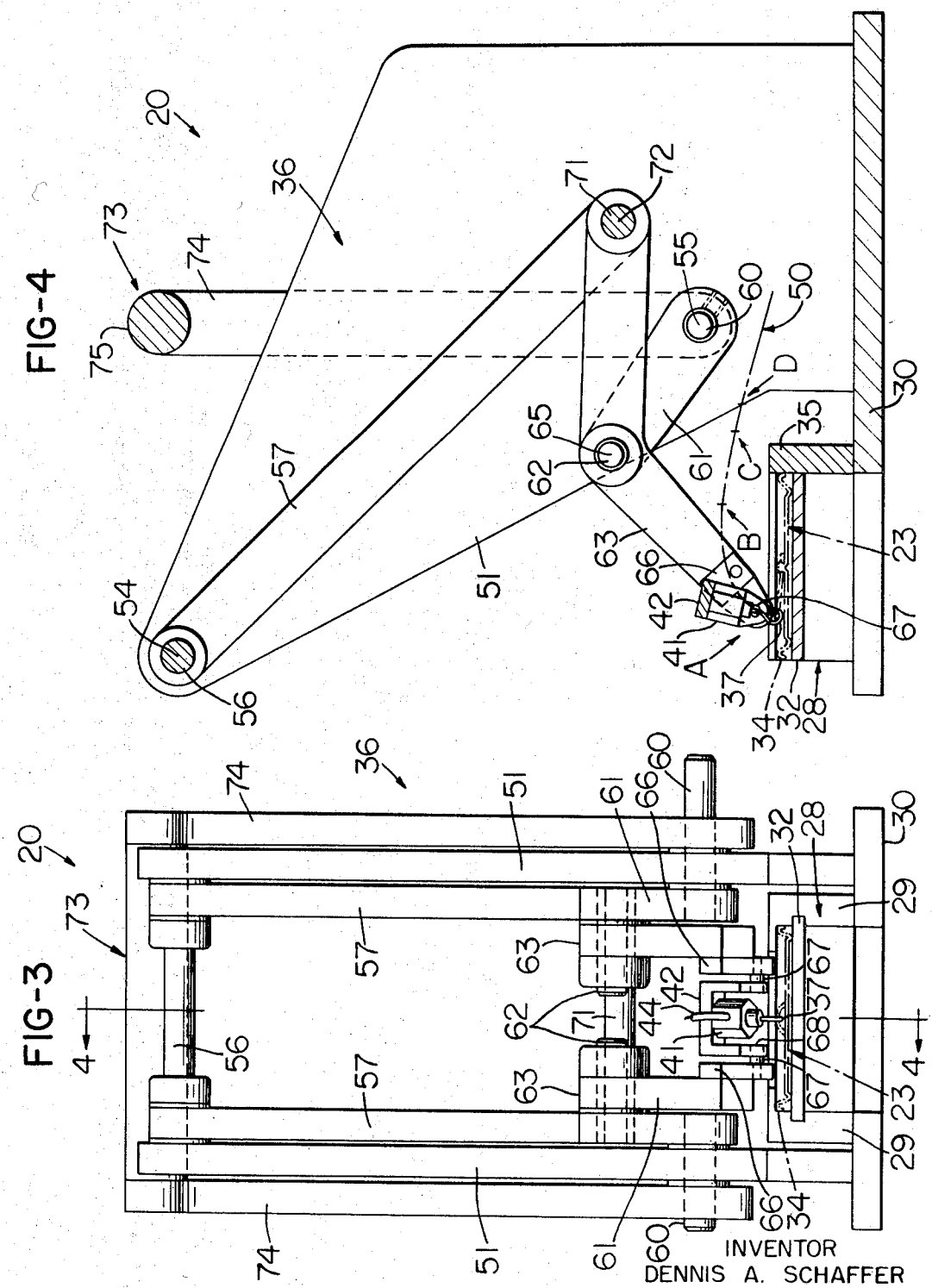

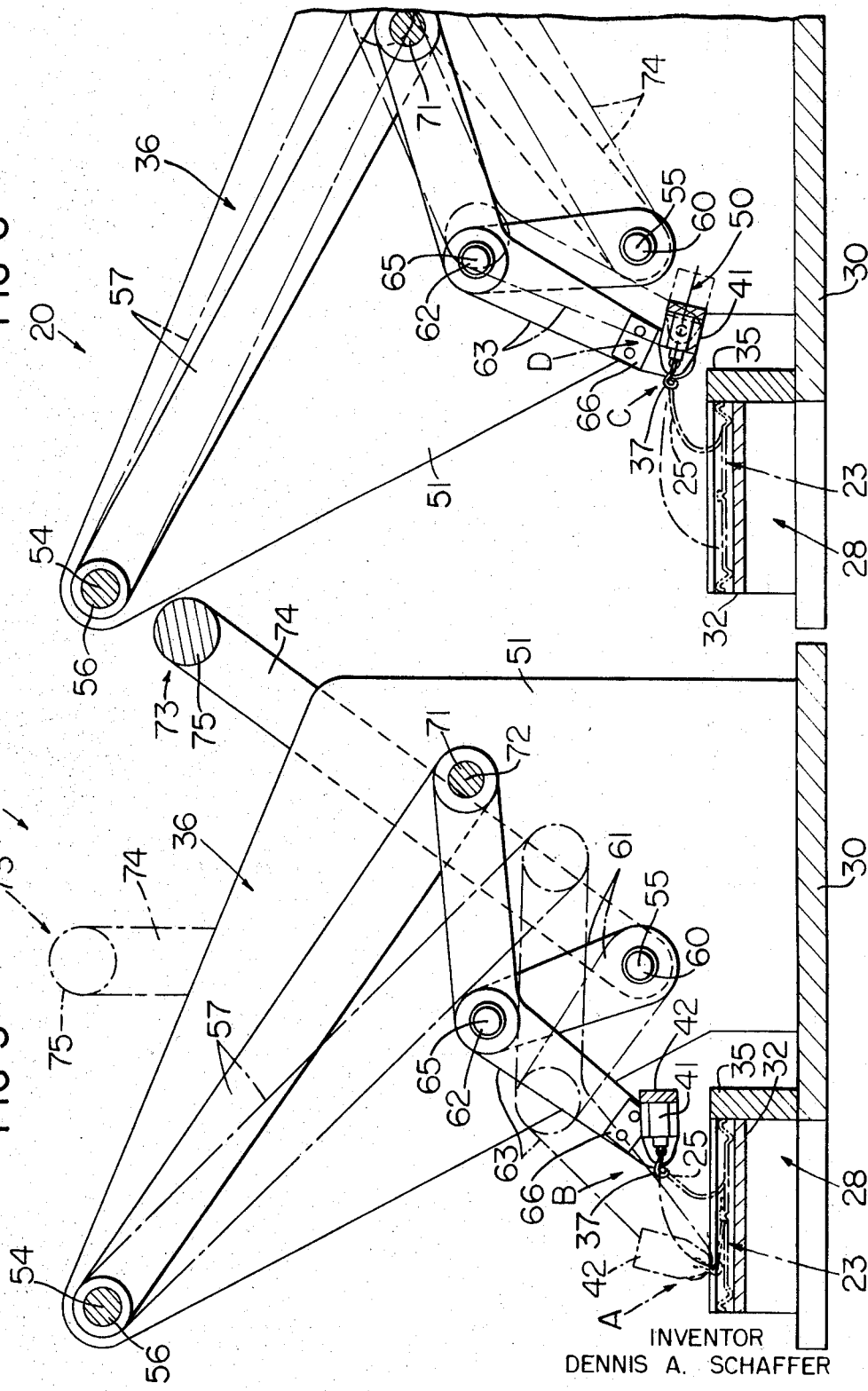

Feb. 2, 1971　　　　D. A. SCHAFFER　　　　3,559,471
APPARATUS FOR AND METHOD OF TESTING A SEVERABLE
SECTION IN A WALL
Filed June 6, 1969　　　　　　　　　　　　4 Sheets-Sheet 4

INVENTOR
DENNIS A. SCHAFFER
BY Glenn, Palmer, Lyne,
Gibbs & Thompson
HIS ATTORNEYS United States Patent Office 3,559,471
Patented Feb. 2, 1971

3,559,471
APPARATUS FOR AND METHOD OF TESTING A SEVERABLE SECTION IN A WALL
Dennis A. Schaffer, Richmond, Va., assignor to Reynolds Metals Company, Richmond, Va., a corporation of Delaware
Filed June 6, 1969, Ser. No. 831,148
Int. Cl. G01n 3/00
U.S. Cl. 73—96   22 Claims

ABSTRACT OF THE DISCLOSURE

An apparatus for and method of measuring the force required to remove a severable section from its associated wall wherein the force exerted against the section to provide a severing thereof is exerted in an arcuate path substantially identical to the path normally followed in severing the section during ordinary usage.

BACKGROUND OF THE INVENTION

Many containers such as metal cans, for example, have severable sections formed therein which are defined by scoring the associated wall in a closed loop path to define the severable or tear-out section and these severable sections with their associated pull devices are often popularly referred to as pull tabs. During the fabrication of a can wall various parameters such as the thickness of the can wall, the character of the tooling, and the cooperating relationships of the associated fabricating dies may change causing the depth and character of the scoring to vary whereby the force required to sever a severable section will vary in a corresponding manner. Therefore, it is necessary to periodically test can ends by utilizing random sampling techniques, or the like, to determine that the severable sections are defined in the required manner.

The devices which have been proposed heretofore for testing the force required to sever severable sections in can ends provide unreliable and inaccurate readings in that the force exerted against each severable section is not applied in a manner which is typical of the way in which the severable section would be removed during ordinary usage. Further, many of the previously proposed testers of this type are generally manually operated and it is practically impossible for different operators or even the same operator to consistently apply a pulling force in substantially the same manner whereby such previously proposed testers are unreliable.

SUMMARY

This invention provides an improved apparatus for and method of measuring the force required to remove a severable section from its associated wall. The apparatus is of simple construction and provides accurate and reliable operation by assuring that the force exerted against the severable section to provide a severing thereof is exerted so that the magnitude and rate of application thereof will not vary substantially from one severable section being tested to the next and such force is exerted in an arcuate path substantially identical to the path normally followed during the severing of such section during ordinary usage whereby such apparatus provides a realistic test evaluation.

Other details, uses, and advantages of this invention will become apparent as the following description of the embodiments thereof presented in the accompanying drawings proceeds.

BRIEF DESCRIPTION OF THE DRAWINGS

The accompanying drawings show present exemplary embodiments of this invention, in which FIG. 1 is a perspective view illustrating one exemplary embodiment of the apparatus and method of this invention;

FIG. 2 is a perspective view of a typical can end which is adapted to be tested on the apparatus of FIG. 1;

FIG. 3 is a view of the linkage assembly comprising the apparatus of FIG. 1 taken essentially on the line 3—3 of FIG. 1;

FIG. 4 is a view taken on the line 4—4 of FIG. 3;

FIGS. 5 and 6 illustrate various positions of the linkage assembly comprising the apparatus of FIG. 1 during the severing of a severable section from an associated can end;

DESCRIPTION OF ILLUSTRATED EMBODIMENTS

Figure 7:
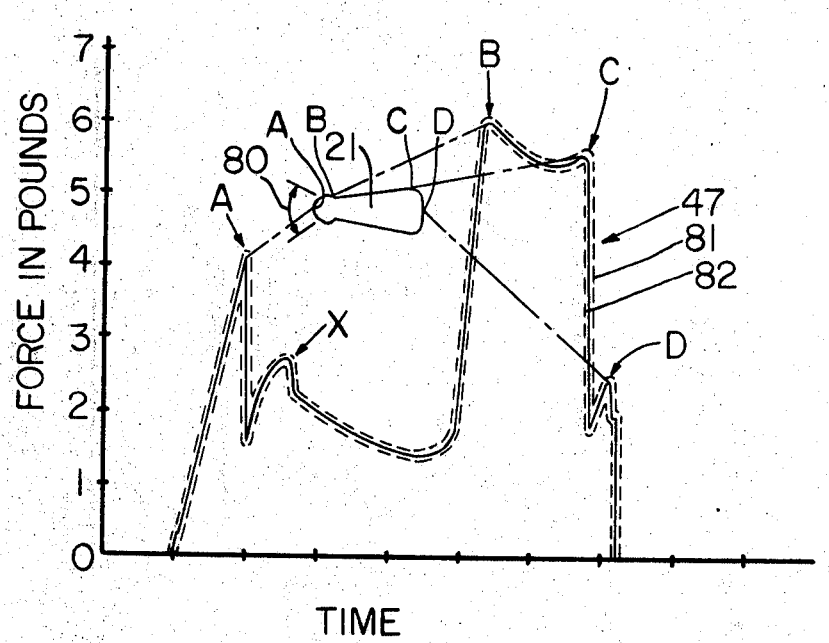
FIG. 7 is a graph provided by an electromechanical device comprising the apparatus of FIG. 1 and showing the pulling force required to sever a severable section from its associated wall with such pulling force being plotted against time and being for a severable section as presented in FIG. 7.

References now made to FIG. 1 of the drawings which illustrates one exemplary embodiment of the apparatus and method of this invention which is designated generally by the reference numeral 20. The apparatus 20 is particularly adapted to remove a tear-out or severable section 21 from an associated metal wall 22 comprising an end closure 23, see FIG. 2, of the type normally provided on a cylindrical container such as a can containing carbonated beverages, or the like.

The severable section 21 in the wall 22 is defined by a score line 24 which is arranged in a closed loop path and the depth of scoring into the metal comprising wall 22 may be different at different positions along the periphery of the severable section 21 and for reasons which are well known in the art. The severable section 21 has a pull device 25 suitably fixed thereto adjacent one end thereof as by a rivet 26 and the rivet 26 may be provided as a separate member or as an integral part of the severable section 21. As previously mentioned, the severable section 21 and its integral pull device 25 are often popularly referred to as a "pull tab."

The apparatus 20 comprises a holding fixture 28 which in this example of the invention supports the end closure 23 in a substantially horizontal position with its pull device 25 readily accessible so that it may be easily grasped and pulled. The fixture 28 has a pair of upwardly extending members 29 each having its lower portion suitably fixed to a supporting base plate 30 comprising the apparatus 20 and its upper portion terminating in an inwardly directed and horizontally extending flange 31. The fixture 28 also has a removable plate 32 which is adapted to be inserted within a pair of cooperating slots 33 provided in the upwardly extending members 29 and once the plate 32 is inserted in position the end closure 23 may be supported on the top surface of the plate 32 with the top surface of an annular flange 34 comprising the end closure 23 supported immediately beneath the lower surfaces of the inwardly directed flanges 31 so that upon pulling upwardly on the pull device 25 the flanges 31 prevent outward movement of the end closure 23. The holding fixture 28 may also be provided with a member 35 adjacent the rear portion of the fixture 28 which serves as a stop against which an edge of the flange 34 of the end closure 23 may be urged during the outward pulling of the pull device 25.

The apparatus 20 has a linkage assembly 36 comprised of a plurality of members, which will be described in detail subsequently, and has a fastener shown as a fastening hook 37 fixed adjacent one end portion of the linkage assembly 36. The apparatus 20 also has a motor shown as an electric motor 40 which is capable of exerting a controlled high starting torque and is operatively connected to the linkage assembly 36 and hence the fastening hook 37 to enable severing of a particular severable section 21 which is provided in an end closure 23 undergoing test evaluation.

The apparatus 20 also has a transducer for converting the mechanical force exerted by the electric motor 40, through the linkage assembly 36 and fastener 37, to a useable output signal and in this example of the invention a piezoelectric transducer 41 is provided. The piezoelectric transducer 41 may be of any suitable known construction and operates so that its electrical output changes in accordance with the tensile force applied thereagainst.

The piezoelectric transducer 41 is suitably supported for pivoting movement on a substantially U-shaped assembly 42 which is pivotally supported adjacent one end portion of the linkage assembly 36 and the transducer 41 has the fastening hook 37 fixed thereto whereby the tensile force required to sever the severable section 21 is exerted directly against the transducer irrespective of the position of the linkage assembly. Further, the pivoting arrangement of the U-shaped support 42 which supports the piezoelectric transducer 41 assures that the severing force is always exerted substantially along a given axis through the transducer 41 to thereby provide accurate output signals from such transducer.

The transducer 41 provides a useable electrical output signal through a suitable electrical lead 44 which is operatively connected to a precision electromechanical device 45 which converts such signal into a visible indication. The visible indication provided by the electromechanical device 45 may be in the form of indicating lights, or other suitable signals; however, in this example of the invention the device 45 comprises a recording pen 46 which operates to automatically plot a typical graph of severing force in pounds versus time whereby a permanent record is provided of the force required to sever a section 21 from its associated end closure 23.

The linkage assembly 36 is of unique construction and assures that the force exerted against the severable section 21 to provide severing thereof is exerted in an arcuate path 50, see FIG. 4, which is substantially identical to the path normally followed in severing the section 21 during ordinary usage, i.e., during routine severing of severable section 21 by a typical user. It will be appreciated that in order to provide realistic test results the testing should be achieved so that the force exerted in severing section 21 should duplicate as nearly as possible the path of force application which would be followed in severing such section during ordinary usage. The testers of this type proposed heretofore are generally deficient in that the force applied against an associated severable section is applied substantially perpendicularly thereto throughout the entire severing of the particular section. The results obtained on such a prior tester are erratic and not truly representative of the forces which are actually required to provide normal severing by a typical user. Further, it is difficult to accurately correlate the forces required to obtain severing by always applying a pulling force in an unchanging direction relative to a section (as is achieved by present testing devices) to the forces which are required to sever a severable section by pulling in an arcuate path similar to the path 50. Thus, it will be appreciated that best results are obtained by assuring that the severing force is always exerted in an arcuate path similar to the path 50 and as provided by the apparatus 20.

The linkage assembly 36 comprises a plurality of cooperating members which are pivotally supported about a pair of fixed axes and in a manner now to be described in detail. In particular, the linkage assembly 36 has a pair of supports shown as vertically arranged support plates 51 which are suitably fixed on the base 30 and arranged in parallel relation. Each plate has a pair of spaced openings 52 and 53 extending therethrough with the openings 52 being arranged in aligned relation and the openings 53 being arranged in aligned relation so that the central axes of openings 52 are arranged on a common fixed axis 54 and the central axes of openings 53 are arranged on a common fixed axis 55 with the axes 54 and 55 being arranged in spaced parallel relation.

The linkage assembly 36 has a shaft 56 which is rotatably supported within the openings 52 with its axis arranged coaxially with the axis 54. The shaft 56 has a pair of arms 57 fixed thereto at opposite ends thereof and the arms 57 and shaft 56 are supported by the plates 51 for substantially frictionless rotation about the fixed axis 54. The linkage assembly 36 also has a pair of spaced driven shafts 60, see FIGS. 1 and 3, and each driven shaft 60 extends through an associated opening 53 and is rotatably supported by an associated plate 51 with its longitudinal axis coinciding with the fixed axis 55.

A pair of crank arms or cranks 61 is provided and each crank has one end fixed to an associated driven shaft 60 for rotation therewith and its opposite end carries an associated pin 62. A pair of links 63 of angled configuration is also provided and each angled link 63 has its central portion arranged adjacent the angled portion thereof and supported on an associated pin 62 which is in turn carried by an associated crank 61 and the pins have their longitudinal axes arranged on a common third axis 65.

The links 63 have what will be referred to as their forward portions arranged in a downwardly inclined manner and each link 63 has a supporting bracket 66 suitably fixed thereto. The brackets 66 are arranged in parallel relation and each has a pin 67 extending therethrough and through an associated outwardly extending leg portion 68 of the U-shaped bracket 42 so as to pivotally support the bracket 42 in position adjacent the terminal forward end of the links 63. As previously mentioned the U-shaped bracket 42 supports the piezoelectric transducer 41 which in turn has the fastener or fastening hook 37 fixed thereon in the manner previously mentioned.

Each of the links 63 has its opposite or rearwardly arranged end pivotally connected to an associated arm 57 through the use of a connecting shaft 71 which has its longitudinal axis arranged on a fourth axis 72. Thus, it will be seen that the linkage assembly 36 has four axes comprised of two fixed axes 54 and 55 and two axes 65 and 72 which move with movement of the linkage assembly 36 and in a manner to be described subsequently. The linkage assembly 36 also has a substantially U-shaped member 73 which has a pair of outwardly extending legs 74 each fixed to an associated one of the shafts 60 utilizing any suitable technique and the U-shaped member 73 has a bight 75 suitably interconnecting the upper ends of the legs 74.

As previously mentioned, the electric motor 40 exerts a mechanical force to move the linkage assembly 36 and cause the fastening hook 37 to exert a pulling force against the pull device 25 so that the pulling force is always exerted in the substantially arcuate path 50. In particular, the electric motor 40 has a driving shaft 76 which is operatively connected to one of the driven shafts 60 and upon rotating the one shaft 60 the U-shaped member 73 transmits a driving torque to the oppositely arranged or far shaft 60 whereby both shafts 60 are simultaneously rotated. Rotation of shafts 60 causes rotation of both cranks 61 about the fixed axis 55 and pivoting of the links 63 about both axes 65 and 72 simultaneously with movement or translation of axes 65 and 72 while arms 57 rotate about fixed axis 54 whereby with the fastening hook 37 hooked around pull device 25 a pulling force is exerted in the arcuate path 50.

Figure 8:
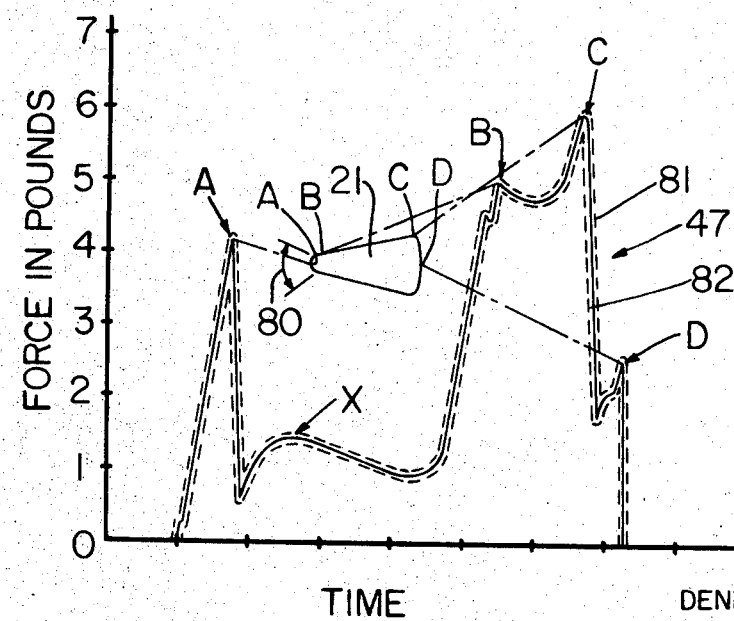
FIG. 8 is a graph similar to the graph of FIG. 7 illustrating the force required to sever a severable section having a configuration as illustrated in FIG. 8.

Reference is now made to FIGS. 4–6 of the drawings which illustrate the linkage assembly 36 in a plurality of four positions A, B, C and D, which are correlated to corresponding positions shown on exemplary severable sections 21 presented in FIGS. 7 and 8 of the drawings. The apparatus and method of this invention enable a precise determination of the force required to sever a severable section 21 from its associated end closure 23 by first installing the associated end closure 23 in the holding fixture 28 essentially as illustrated in FIG. 1 of the drawings.

With the severable section 21 ready to be severed, the linkage assembly is in the position which will be referred to as position A and is shown in FIGS. 1 and 4 and a corresponding position or point A is indicated on the section 21 shown in FIG. 7. The electric motor 40 rotates the shafts 60 moving the linkage assembly from the dotted line position of FIG. 5 (which corresponds to the solid line position of FIG. 4) to the solid line position of FIG. 5 and hence moves from position A to a position which will be referred to as position B in FIG. 5. Further rotation of the shafts 60 by the motor 40 causes movement of the linkage assembly 36 from the solid line position of FIG. 5 to the solid line position of FIG. 6, which will be referred to as position C. The linkage assembly is then moved by the motor 40 to position D, indicated by dotted lines in FIG. 6, whereupon complete severing of the severable section 21 is achieved with the pulling force being exerted in arcuate path 50 which is substantially identical to the path normally followed by a user grasping a beverage can having end closure 23 installed thereon with one hand and inserting a finger through the pull device 26 and pulling.

As previously indicated, the apparatus 20 may comprise an electromechanical device 45 for making a permanent graph of the force required to sever a particular severable section 21. Reference is now made to FIG. 7 of the drawings which illustrates the typical graph 47 made by the device 45 and various points A through D on the graph are correlated with corresponding points or positions A through D along the severable section 21. Also, points A through D correspond to positions A through D of the linkage assembly shown in FIGS. 4–6.

The graph of FIG. 7 was made by testing an end closure 23 of standard size and used on a 12 fluid ounce metal can and the wall 22 of end closure was made of 5086–H36 aluminum alloy having a specification thickness ranging between .0135–.016 inch thick. The scoring defining the severable section 21 was achieved so that the arcuate length indicated at 80 was scored to provide a residual metal thickness of .004 inch and the remaining peripheral outline of section 21 was held by a residual metal thickness of .0065 inch. Particular attention is directed to the point indicated at X in the graph 47 of FIG. 7 which indicates the point at which the severed end portion of section 21 was bent from a transverse attitude to an attitude substantially parallel to the wall 22.

Reference is now made to FIG. 8 which presents another exemplary graph of the force required (versus time) to sever another severable section from an end closure which is substantially identical to the end closure 23. Accordingly, for ease of presentation the severable section of FIG. 8, the graph, and the various points will be given the reference numerals 21, 47 and A–D respectively as in the presentation of FIG. 7.

The severable section 21 of FIG. 8 has a substantially triangular or wedge-shaped configuration and is provided by suitably scoring its associated wall made from 5082–H18 aluminum alloy, also having a specification thickness ranging between .0135 and .016 inch.

As in the case of the severable section presented in FIG. 7, the scoring of the wall defining the severable section of FIG. 8 was such that the arcuate length indicated at 80 was scored to provide a residual metal thickness of .004 inch and the remainder of the peripheral outline was scored to provide a residual metal thickness of .0065 inch. Point X on the graph of FIG. 8 again indicates the point at which the severed portion of section 21 is bent to an attitude arranged substantially parallel to its associated wall.

The apparatus 20 provides a test of the force required to remove a severable section 21 from its associated wall under conditions closely approximating conditions encountered during actual usage with optimum reliability and while providing a permanent record of the test. In addition, the piezoelectric transducer 41 assures that the severing force is measured essentially at the point of application against the pull device 25.

The apparatus 20 may also be used to determine and evaluate the depth and exact arcuate length at which the scoring depth should be changed in a wall 22 to provide the desired severing characteristics. In addition, it is a simple matter to provide suitably lined graph paper for the device 45 which has predetermined boundaries provided thereon as shown by dotted lines 81 and 82 in FIGS. 7 and 8 and which define the area within which a particular graph 47 may fall to indicate an acceptable end closure.

Although particular details have not been provided regarding the electromechanical device 45, it will be appreciated that such device may be of any suitable known construction and be provided with a suitable electrical amplifier to amplify the signals from the piezoelectric transducer 41 as well as means for converting the amplified electrical signals into mechanical energy to move the recording pen 46 in the desired manner and provide the graph of pulling force versus time. It will also be appreciated that the electromechanical device 45 may be provided with suitable control knobs to enable precise adjustment and operation thereof in the requird manner.

As previously explained, the output signal provided by the piezoelectric transducer 41 is in the form of an electrical signal which may be converted into a visible indication such as is provided by the device 45 in defining the graphs of FIGS. 7 and 8. However, it will be appreciated that the electrical signal provided by the piezoelectric transducer 41 may set off a suitable alarm, or the like, to indicate that the force required to remove the severable section 21 is either too great or not large enough whereby the electromechanical device 45 may be replaced by such alarm, if desired.

The apparatus 20 is shown as having a removable plate 32 in its holding fixture 28 and upon removing the plate 32 a filled can having an end closure 23 may be placed in position beneath the holding fixture 28 and supported on an associated supporting structure 83 indicated by dotted lines in FIG. 1 whereby the apparatus 20 may be utilized in testing filled cans as well. The supporting structure 83 may also be provided with removable supports 84 of different thickness to enable testing of filled cans having different heights.

While present exemplary embodiments of this invention, and methods of practicing the same, have been illustrated and described, it will be recognized that this invention may be otherwise variously embodied and practiced by those skilled in the art.

What is claimed is:

1. An apparatus for measuring the force required to remove a severable section from its associated wall comprising, a fastener adapted to be fastened to said section, means for applying a mechanical force to remove said section, a transducer for converting said mechanical force into a usable output signal, and a linkage assembly, said linkage assembly and transducer being operatively connected between said fastener and force applying means with said linkage assembly assuring that the force exerted to provide a severing of said section is exerted in an arcuate path substantially identical to the path normally followed in severing said section during ordinary usage.

2. An apparatus as set forth in claim 1 in which said fastener comprises a fastening hook adapted to be hooked around a portion of a pull device fixed to said section and said linkage assembly comprises a plurality of cooperating members pivotally supported about a pair of fixed axes.

3. An apparatus as set forth in claim 2 in which said transducer is fixed to a portion of said linkage assembly and said fastening hook is supported by said transducer so that the force required to sever said section is applied through said hook directly against said transducer irrespective of the position of said linkage assembly.

4. An apparatus as set forth in claim 2 in which said means for applying a mechanical force comprises an electric motor operatively connected to said linkage assembly through a drive shaft having an axis coinciding with one of said fixed axes.

5. An apparatus as set forth in claim 1 in which said linkage assembly comprises a pair of spaced supports arranged in parallel relation, a pair of spaced openings extending through each support with the central axis of each opening in one support being aligned with the central axis of an associated opening in the other support to define a pair of parallel fixed axes, a shaft being rotatably supported by said supports coaxially with a first axis of said pair of fixed axes and within an associated set of aligned openings in said supports, a pair of arms fixed to opposite ends of said shaft for rotation therewith about said first axis, a pair of spaced rotatable driven shafts each extending through an associated one of said openings in an associated support and being supported by its support along a common axis defined by the second axis of said pair of fixed axes, a pair of cranks each having one end fixed to an associated one of said driven shafts for rotation therewith and each having an opposite end carrying an associated pin, a pair of links each being pivotally supported on an associated pin with said pins being arranged on a common third axis, said links carrying said fastener adjacent one end thereof and each of said links being pivotally connected to an associated arm adjacent its opposite end on a fourth axis, and a substantially U-shaped member having outwardly extending legs each fixed to an associated one of said pair of driven shafts, said means applying a mechanical force rotating both of said driven shafts causing both cranks to be rotated about said second axis and said links to pivot about said third and fourth axes simultaneously with movement of said third and fourth axes and said arms to rotate about said first axis, whereby said fastener is moved in said arcuate path.

6. An apparatus as set forth in claim 5 in which said transducer comprises a piezoelectric transducer.

7. An apparatus as set forth in claim 5 in which said means applying a mechanical force comprises a drive motor having a driving shaft operatively connected to one of said driven shafts to thereby rotate said one shaft directly and rotate the other of said driven shafts by the driving connection provided by said U-shaped member.

8. An apparatus as set forth in claim 1 in which said fastener comprises a fastening hook adapted to be hooked around a portion of a pull device fixed to said section, said linkage assembly comprises a plurality of cooperating members pivotally supported about a pair of fixed axes, said transducer is supported by said linkage assembly, with said fastening hook being supported by said transducer so that the force required to sever said section is applied through said hook directly against said transducer irrespective of the position of said linkage assembly, and said output signal comprises an electrical output signal.

9. An apparatus as set forth in claim 8 and further comprising an electromechanical device for converting said electrical output signal to a visible indication.

10. An apparatus as set forth in claim 8 and further comprising an electromechanical device for converting said electrical output signal into a permanent record.

11. An apparatus as set forth in claim 8 and further comprising a U-shaped bracket pivotally supporting said transducer on said assembly.

12. An apparatus for measuring the force required to remove a severable section provided in a wall of a container, said apparatus comprising, a fastener adapted to be fastened to a pull device fixed to said section, means for applying a mechanical force to remove said section, a piezoelectric device for converting said mechanical force into a usable electrical signal, and a linkage assembly, said linkage assembly and piezoelectric device being operatively connected between said fastener and force applying means with said linkage assembly assuring that the force exerted to provide a severing of said section is exerted in an arcuate path substantially identical to the path normally followed in severing said section during ordinary usage.

13. An apparatus as set forth in claim 12 and further comprising a holding fixture for holding said wall in a predetermined position.

14. An apparatus as set forth in claim 13 in which said fastener comprises a fastening hook adapted to be hooked around said pull device, said linkage assembly comprises a plurality of cooperating members pivotally supported about a pair of fixed axes, said piezoelectric device is supported by said linkage assembly adjacent an end portion thereof, and said fastening hook is supported by said piezoelectric device so that the force required to sever said section is applied through said hook directly against said piezoelectric device irrespective of the position of said assembly.

15. An apparatus as set forth in claim 12 and further comprising an electromechanical device for converting said electrical output signal into a permanent record chart.

16. An apparatus as set forth in claim 12 in which said linkage assembly comprises a support, a pair of spaced openings extending through said support with the central axes of said openings defining a pair of parallel fixed axes, a shaft being rotatably supported by said support coaxially with a first axis of said pair of fixed axes and within an associated opening in said support, an arm fixed to said shaft for rotation therewith about said first axis, a driven shaft extending through the second opening in said support and being supported by said support coaxially with the second axis of said pair of fixed axes, a crank having one end fixed to said driven shaft for rotation therewith and having its opposite end carrying an associated pin, a link pivotally supported on said pin with the central axis of said pin defining a third axis, said link carrying said fastener adjacent one end thereof and said link being pivotally connected to said arm adjacent the opposite end of said link on a fourth axis, said means applying a mechanical force rotating said driven shaft causing said crank to be rotated about said second axis and said link to pivot about said third and fourth axes simultaneously with translating movement of said third and fourth axes and said arm to rotate about said first axis, whereby said fastener is moved in said arcuate path.

17. An apparatus as set forth in claim 16 in which said means applying a mechanical force comprises an electric drive motor having a driving shaft operatively connected to said driven shaft.

18. A method of measuring the force required to remove a severable section provided in a wall of a container, said method comprising the steps of, supporting said wall to enable grasping of a pull device which is fixed to said section, fixing a fastener to one end of a transducer which is adapted to convert a mechanical force into a usable output signal, operatively connecting said fastener to said pull device, and exerting a pulling force against said section by applying a pulling force against said transducer to thereby provide an output signal which indicates the magnitude of said force, said pulling force being exerted in an arcuate path substantially identical to the path normally followed in severing said section during ordinary usage, whereby said method provides a realistic measure of said force.

19. A method as set forth in claim 18 in which said fastener comprises a fastening hook and said step of operatively connecting said fastener comprises hooking said fastening hook around said pull device.

20. A method as set forth in claim 18 in which said step of exerting a pulling force comprises exerting said pulling force using an electric motor providing a controlled output torque to drive a linkage assembly which carries said transducer, said arcuate path being provided by the action of said linkage assembly.

21. A method as set forth in claim 18 in which said fixing step comprises fixing a fastener to one end of said transducer which is in the form of a piezoelectric device which operates to convert the pulling force applied thereagainst and resisted by said section into a usable electrical output signal.

22. A method as set forth in claim 21 comprising the further step of converting said electrical output signal into a visable indication.

References Cited
UNITED STATES PATENTS

| | | | |
|---|---|---|---|
| 2,674,123 | 4/1954 | Sooy | 73—96 |
| 3,269,175 | 8/1966 | Sprosty | 73—141 |
| 3,318,143 | 5/1967 | Helms | 73—96 |
| 3,464,261 | 9/1969 | Helms | 73—96 |

CHARLES A. RUEHL, Primary Examiner

U.S. Cl. X.R.

73—141